United States Patent

Feldpausch

[11] Patent Number: 5,861,183
[45] Date of Patent: Jan. 19, 1999

[54] PREPARATION OF FROZEN DESSERT PRECURSOR

[76] Inventor: David Feldpausch, 737-11 Woodside La. East, Sacramento, Calif. 95825

[21] Appl. No.: 635,685

[22] Filed: Apr. 22, 1996

[51] Int. Cl.⁶ .................................................. A23G 9/00
[52] U.S. Cl. ..................... 426/100; 426/101; 426/515; 426/524; 426/615
[58] Field of Search ............................. 426/89, 100, 101, 426/102, 249, 274, 615, 524, 515, 583

[56] References Cited

U.S. PATENT DOCUMENTS

| | | | |
|---|---|---|---|
| 2,123,215 | 7/1938 | Thomas | 426/515 |
| 2,570,031 | 10/1951 | Gibson | 426/101 |
| 3,732,114 | 5/1973 | Field et al. | 426/524 |
| 4,001,439 | 1/1977 | Zonni et al. | 426/101 |
| 4,948,614 | 8/1990 | Feldpausch | 426/565 |
| 5,098,731 | 3/1992 | Feldpausch | 426/565 |
| 5,246,175 | 9/1993 | Feldpausch | 99/510 |

FOREIGN PATENT DOCUMENTS

| | | | |
|---|---|---|---|
| 506987 | 10/1992 | European Pat. Off. | 426/515 |
| 14 92 849 | 5/1979 | Germany | 426/515 |

*Primary Examiner*—William H. Beisner
*Attorney, Agent, or Firm*—Mark C. Jacobs, Esq.

[57] ABSTRACT

A process and apparatus is disclosed for the preparation of individual quick frozen bars, to be united to form a frozen precursor (the product of the invention) for the preparation of a frozen dessert and more particularly a masticated banana frozen dessert. Uniform flavor is achieved by control of the size and number of the respective individual bars to be laminated together. Uniform portion control in the machine that prepares the frozen dessert is achieved by the use of similar sized segments of the precursor sandwich formed by the lamination of individual frozen bars. The apparatus includes molds that may be individual or they may be formed together into an integrated multi-mold tray for use in the apparatus.

14 Claims, 4 Drawing Sheets

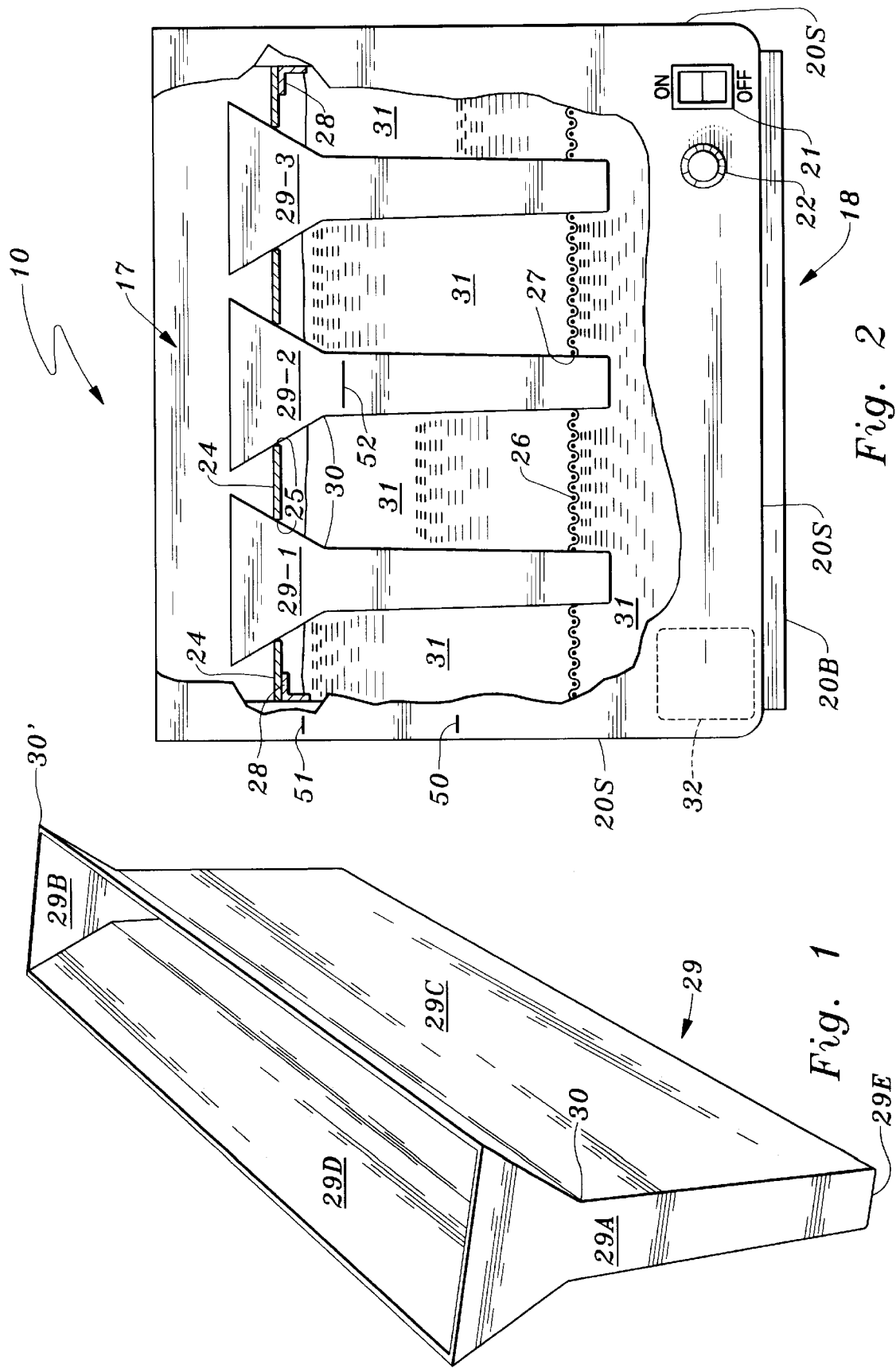

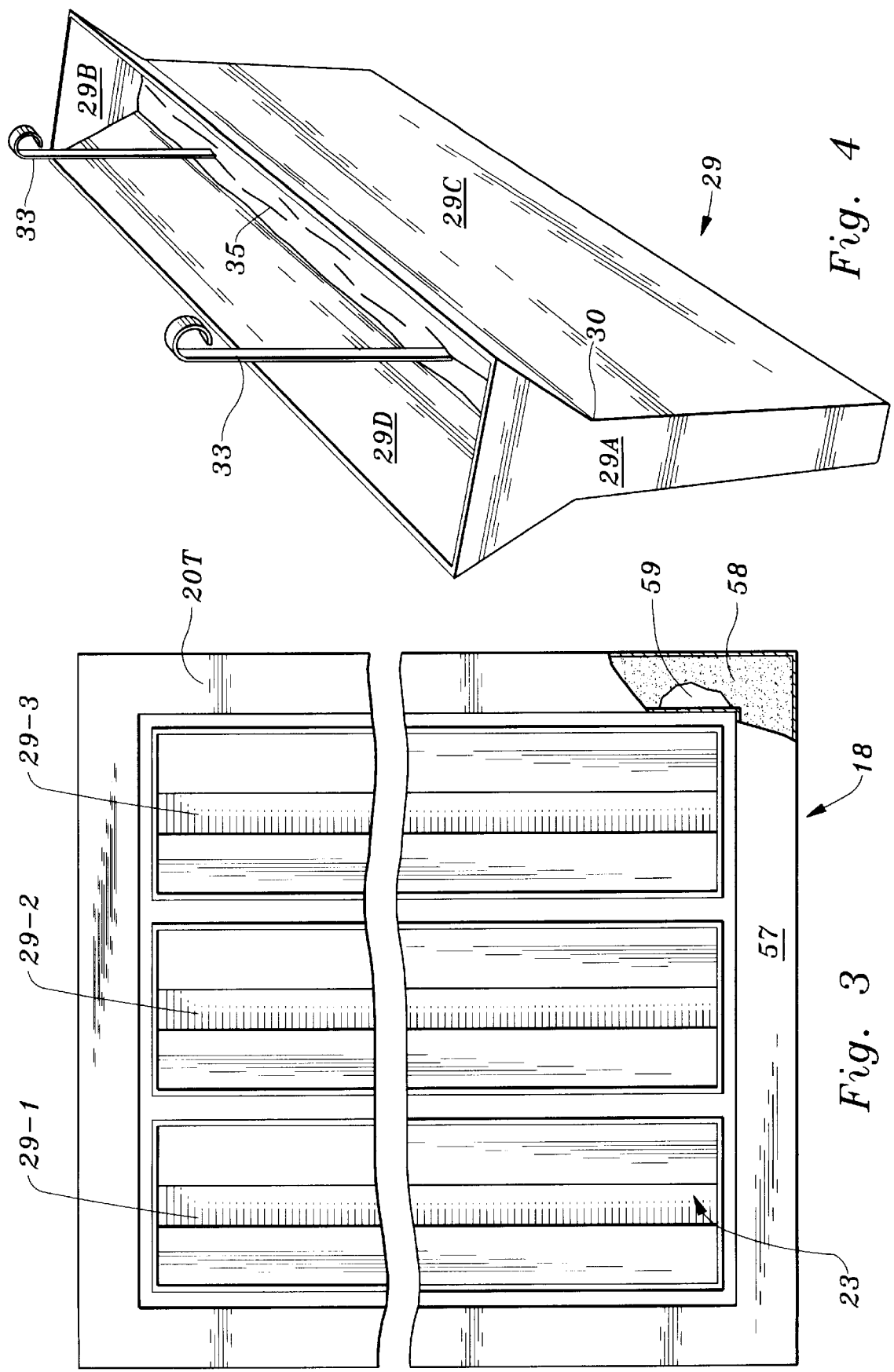

PREPARATION OF FROZEN DESSERT PRECURSOR

FIELD OF THE INVENTION

This application relates to an apparatus and process for the preparation of the precursor, the product of the invention, for a frozen dessert in portion controllable quantities.

BACKGROUND OF THE INVENTION

This application pertains to an apparatus for quick freezing fruit material utilized as the precursor for a frozen dessert.

The application also pertains to the novel product constituting the precursor for the frozen dessert. It is known from the Feldpausch U.S. Pat. Nos. 4,948,614 and 5,098,731 to prepare a frozen dessert based upon masticated bananas either alone or in conjunction with other edible materials such as additional fruits, cookie crumbs, chocolate and the like.

It is also known from Feldpausch U.S. Pat. No. 5,246,175 to provide a novel apparatus for the preparation of this dessert. The apparatus of the aforementioned patent utilizes as a raw material masticated banana alone or in conjunction with other finally divided or even liquefied fruits, small particulates such as nuts, cookie sections and the like. Thus for preparation of a strawberry flavored frozen dessert based on these masticated bananas, it is known to add strawberry puree to the masticated banana at the time of preparation of the end product.

One of the difficulties that has been encountered in the preparation of the frozen dessert is the achievement of uniform consistency both as to flavor and taste of a large plurality of individual servings of a flavored banana based frozen dessert. Thus difficulty has been found in adding a finite quantity of strawberry puree, ground nuts, et cetera to the frozen banana masticate in order to achieve uniform servings from the beginning of a lot to the end of a lot. Such uniformity is necessary in order to market the product in commercial quantities along with retaining the characteristics associated with the quick freezing procedure.

One approach was to utilize a liquefied slurry or puree of strawberry, raspberry, pineapple and other fruits, and add this to the frozen masticated banana in the apparatus of U.S. Pat. No. 5,246,175 issued Sep. 21, 1993 for the preparation of the final product. The problem that arose was the fact that the liquefied or slurry material was of a warmer temperature than the frozen banana and therefore defrosting of the frozen concoction was enhanced by the presence of the warmer additive material. Similar deficiencies were found with the use of room temperature nuts and other additives.

It is an object therefore of this invention to provide a process and apparatus for the preparation of quick frozen additives for use with masticated banana for the preparation of the flavored frozen dessert.

Another object is to prepare a frozen precursor for a banana based frozen dessert that is capable of undergoing uniform portion control.

A further object is to provide an apparatus for preparation of quick frozen precursor for banana based frozen desserts.

Still another object is to provide a novel quick freezing process for the preparation of precursor bars for use in making a flavored banana based frozen dessert.

Yet another object is to provide the actual precursor itself as the product of the apparatus disclosed herein.

Other objects of the invention will in part be obvious and will in part appear hereinafter.

The invention accordingly comprises the device possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 1 is a perspective view of a freezing mold used to make the product of the apparatus and process of this invention.

FIG. 2 is an elevational view, partially in cutaway of the freezing apparatus forming a part of this invention.

FIG. 3 is a top plan view of the freezing apparatus shown in FIG. 2.

FIG. 4 is a perspective view of one freezing mold with frozen dessert ingredient therein.

SUMMARY OF THE INVENTION

Figure 5:
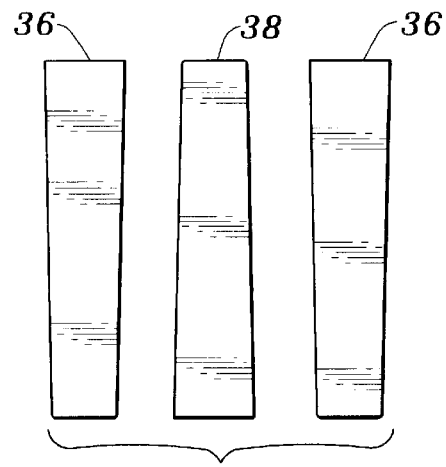
FIG. 5 is an end elevational view of three individual frozen blocks of frozen dessert ingredient.

A process and apparatus are disclosed for the preparation of quick frozen additive bars for use with frozen masticated banana bars to form a sandwich which sandwich is designed a precursor for the preparation of a flavored frozen dessert. Uniform portion control in the preparation of the banana based frozen dessert can be achieved by use of equal sized segments of the frozen precursors of this invention. Two different but related mold forms can be employed.

The apparatus can be used to make bars for the preparation of precursors of other novelty desserts which bars may include any and all of ice cream mix, ice milk mix, pudding, yogurt, sherbet and fruit and mixtures thereof.

DESCRIPTION OF THE PREFERRED EMBODIMENT

This application pertains to an apparatus, a process, and the product made by the process. The apparatus is a immersion freezer and the molds used therein, while the process relates to a mode of quick freezing a plurality of eatable materials to form the product; namely, the precursor for a previously patented frozen dessert.

The apparatus of the invention is best seen in FIG. 2. The apparatus, an immersion freezer 18 is seen to be configured as a box having four interconnected side walls 20S which meet at right angles, and all of which are connected to a base 20B, also at about a 90 degree angle. A sandwich construction is employed for each of the sidewalls 20S and the base 20B. This sandwich is conventional in the freezer art and consists of an outer skin and an inner skin, both of food grade plastic or stainless steel with a core of wood or urethane foam. Such a construction is illustrated in FIG. 3, as well as in FIG. 7 the latter of which depicts the optional cover for the freezer 18 and discussed at the text aspect concerning FIG. 7. However in the FIG. 7 unit only one skin is required due to the shape of the member. Here in FIG. 3, the bulk of the member 20T is the outer skin 57, and a corner of same has been exposed to show the foam 58. A portion of the top 20T has been cut away two layers deep to expose the lower skin 59.

While the freezer 18 is open at the top, a cover such as the one discussed briefly infra may be utilized with the freezer for better cold retention.

The discussion returns to FIG. 2 concerning the first embodiment 10. Seen in the lower right-hand corner of one wall 20S are an optional off/on switch 21 and an adjustable thermostat 22. These and other components such as the compressor, 32, wiring, and the like are all conventional to the liquid medium freezer art and their operation to cool the brine solution 31, is well understood. These freezers 18 are referred to as quick immersion freezers since they use a brine solution as the heat transfer medium, and the object to be frozen is actually dipped either directly or indirectly into the medium. In your home freezer the cold air environment is created by the circulation of a refrigerant within a series of tubes. Something that freezes in seconds to minutes in an immersion freezer can require several hours to freeze in a home freezer. Frozen food companies usually employ a blast freezer which utilizes a long tunnel through which the items to be frozen travel in a continuous path, while cold air is blown over the product to be frozen. They are a continuous process as opposed to the batch processing of the immersion freezer.

The immersion freezers employ a compressor to circulate the brine solution through a heat exchanger, not seen. Once the heat is removed from the brine, the brine is repumped continuously back into the tub 17. Brine solution immersion freezers are known in the art.

Spaced up from the bottom wall 20B is a lower frame member or rack 26. The rack has a plurality of mold receiving elongated slots 27 therein. Rack 26 may be conventionally attached to the sidewalls 20S or rack 26 may be disposed to rest upon conventional shelf rests, 28, which rests themselves are screwed to the sidewalls of freezer 18. Rack 26 should be made of a mesh or screen material such as stainless steel with an aperture size such that the flow of the brine solution 31 is not impeded. This is necessary as the brine solution is the primary source of heat removal from the molds, while the compressor serves as a heat exchanger to remove the heat from the brine or salt solution within the tub 17 of the freezer apparatus 18.

Spaced down from the upper edge of the sidewalls 20S and spaced up from the lower rack 26 is an upper frame member or rack 24. This rack is disposed in any of the modes as has been indicated above with reference to rack 26. It too has a series of mold receiving slots, 25 therein, which slots are laterally aligned with the slots 27 of the lower rack in order for the respective freezing molds 29 to reside in a generally vertical position when placed within a vertically spaced slot, of each of racks 24 and 26. Rack 24 is preferably not of a mesh material, as it is desired to keep out the ambient air which is relatively much warmer than the temperature of the brine 31.

Disposed on the inside of the freezer between base 20B and the upper rack 20 is a brine bath, 31. Such brine baths are conventional in the freezing art and are readily available.

Each of the freezing molds 29 has a funnel like cross section as seen in FIG. 2, when viewed vertically.

While freezer 18 has been indicated to be open from the top, there is present a top frame member 20T, which is configured like a picture frame. See FIG. 3. This member adds structural strength and helps to keep ambient air away from the extremely cold brine solution in containment.

In FIG. 1, a typical freezer mold 29 of this invention is seen. Each mold 29 includes a pair of spaced end walls 29A, 29B. Each end wall is slightly tapered from its interface with bottom wall 29B to flare point 30. The edges of each end wall then diverge upwardly and outwardly to form a top section to a maximum at the top edge thereof, 30'.

Each of the two sidewalls thereof, 29C and 29D are normally disposed along the left and right edges of the two end walls 29A, 29B. Each sidewall 29C is flat from inception at the bottom wall 29E to the flare point 30 at which each respective sidewall diverges outwardly and oppositely, to a maximum amount which corresponds to the top edge thereof at point 30'. The area of each sidewall between the flare port 30 and the top edge 30' is also generally flat. Flare point 30 also serves as an approximation of the fill line of each freezer mold.

By having the sidewalls taper inwardly slightly along the depth thereof, frozen material is easier to remove from the mold than if the sidewalls were straight.

Reference is now made to FIG. 3. Here the top frame 20T is seen, as are a trio of freezer molds designated 29-1, 29-2, and 29,3.

As can be seen the three freezer molds substantially abut one another within the upper frame member 24, itself not being visible in this view.

The molds are filled with masticated banana or other fruit, a mixture of syrup and nuts or fluid chocolate; the molds are set into the racks, both upper and lower and then frozen.

When the masticated banana or other dessert ingredient has partially frozen, the handles 33, which preferably have a pointed end are inserted into the partially frozen dessert ingredient to ease removal of the frozen food from the mold 29, as will be explained below in connection with the process for making the frozen dessert precursor. See FIG. 4.

In FIG. 2, two optional fill lines 50 and 51 have been imprinted on the outside and if desired on the inside of the freezer 18. Level indicators 50 and 51 as seen in FIG. 2 which may be etched, stamped or otherwise applied to the surface of the wall of the freezer 18 serve as reference points for the addition of the brine solution. Lower point 50 is the level to which brine should be added before the placement of the filled molds into the freezer unit. If all of the molds are placed into the freezer 18, be they filled or empty as the moment may dictate, the amount of fluid displaced will be the same. Level point 2, the higher indicator, 51, represents the level to which the brine will rise, to exceed in height the level of the contents of any and all of the filled and/or empty molds 29 because of this displacement. Fill line 52 which is also applied in like manner to each individual mold is depicted on mold 29-2 of FIG. 2 and is seen to be just slightly below indicator 51. This line represents the level above which the mold should not be filled in order to ensure uniform freezing of the entire contents within the brine.

Figure 7:
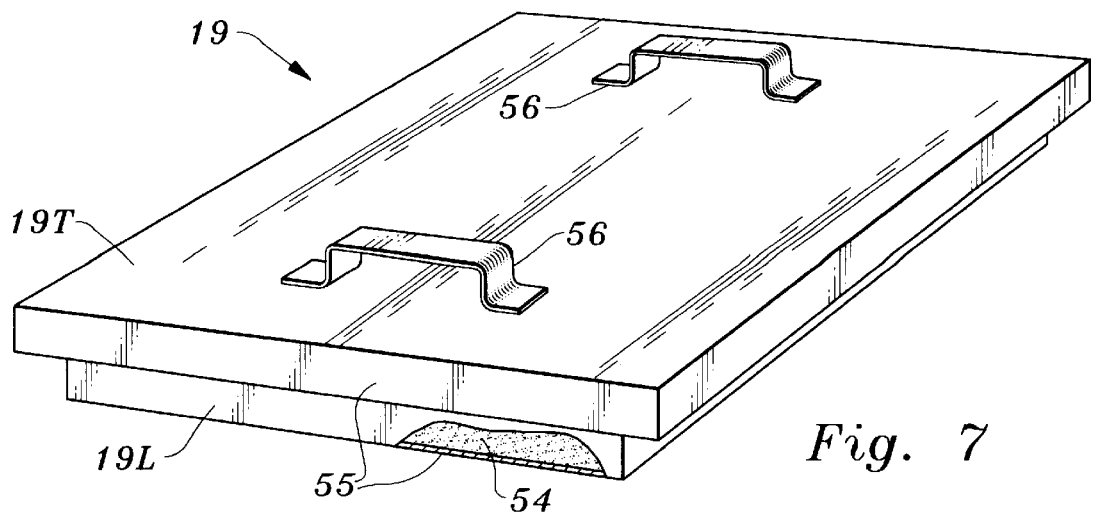
FIG. 7 is a perspective view of an optional cover for the freezing apparatus of this invention.

In FIG. 7 an optional cover 19 for freezer 18 is shown. This cover which may be employed to avoid loss of cold to the environment. The cover has an inwardly spaced T-shaped vertical cross section such that the lower portion 19L will fit within the opening or cavity 23 of the freezer 18, i.e., within the tub as seen in FIG. 3. The upper portion 19T is adapted to rest on wall 20T. One or more conventional handles 56 may be provided for attachment to the upper surface thereof. Cover 19 is preferably formed of a sanitary skin 55, such as of a washable food grade plastic or stainless steel over an insulative core 54, such as of wood or urethane foam.

Figure 9:
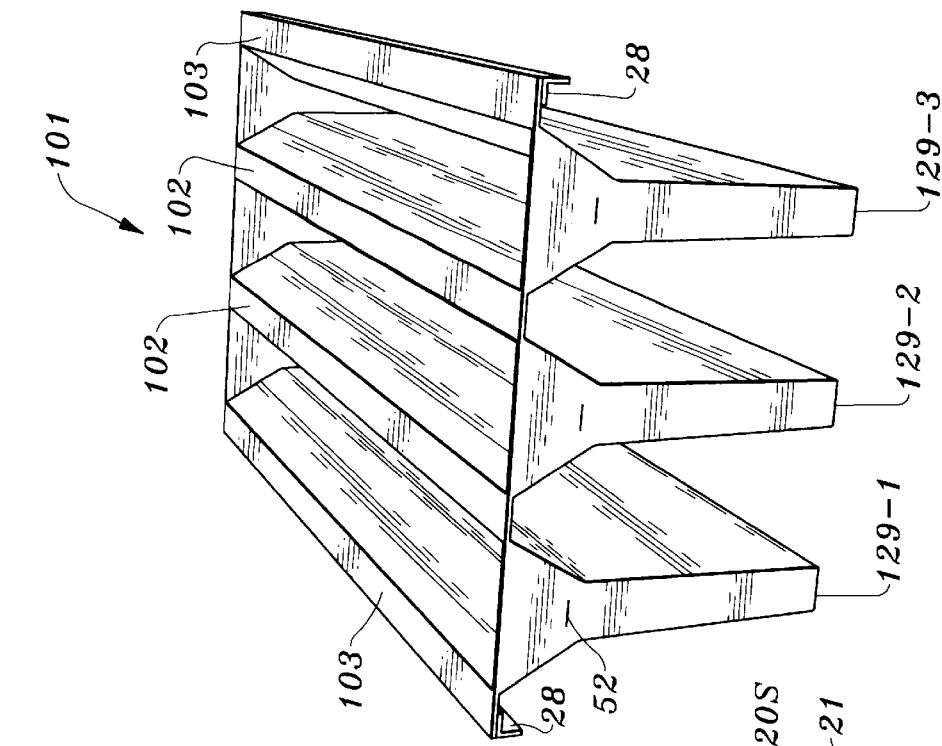
FIG. 9 is a perspective view of the multi mold tray seen in FIG. 8.
Figure 8:
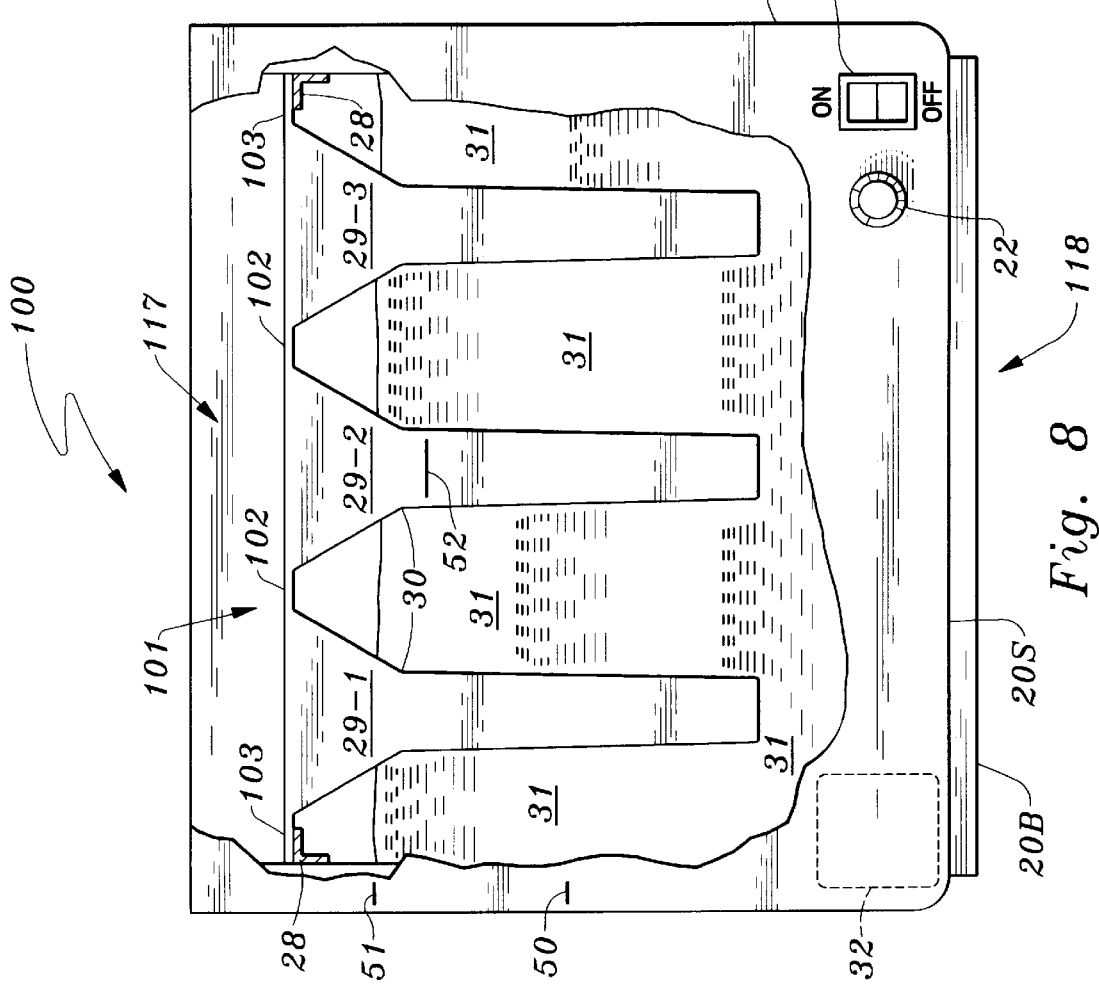
FIG. 8 is view similar to FIG. 2, but employees an integrated multimold tray, as opposed to individual molds.

FIG. 8 illustrates the second embodiment 100, of a freezer, 118 closely resembling the one of FIG. 2 and which has a tub 117. Since like numbers will refer to like parts, those parts that bear similar numbers need not be further discussed. In this freezer there is no lower rack 26 and of course no interfaces 27 and no upper rack 24 and its interface 25 either. Rather this embodiment features a multimold tray 101 in which the separate rack is replaced by sheet metal joining and surrounding the individual molds to form an integrated member, 101. See FIG. 9.

Multimold tray 101 as seen in this figure, includes 3 individual molds designated 129-1, 129-2, and 129-3. They are configured the same as molds 29 previously discussed and may include the fill lines 52 previously noted. The three individual molds are connected by intermediate spacer plats 102 disposed horizontally between the first and second and between the second and third of such individual molds. The outer two molds each have a horizontally dependent outward extending flange plate 103. Fore and aft flange plates, not shown could run along the front of the interconnected trio of molds 129-1, 129-2, and 129-3 and the back thereof. The outward extending flange plates are seen to be resting on shelf rests 28 previously described. Here too, conventional pump compressor 32 has an inlet from the tub and an back to the tub for circulating the brine. The other conventional parts associated with such a compressor are employed, as are the power switch 21 and the thermostat 22.

Cover 19 discussed in connection with FIG. 7 is equally suitable for employment with this embodiment.

While the apparatus hereinabove described was originally intended for the manufacture of bars to form the precursor of a banana based frozen dessert, it is seen that precursors for other frozen novelty desserts can be prepared using the freezer of this invention. Thus frozen novelty desserts which combine bars of one or more of quick frozen ice cream mix, ice milk mix, yogurt, pudding, sherbet and fruit among other edible substances are envisioned.

The reader is advised that whereas in FIG. 4 the handles are seen to be disposed inwardly from each end wall 29A, 29B in the bar being formed by freezing, such depiction is for ease of understanding of the drawing. In practice, it is preferred to have the two handles 33 adjacent the end of the frozen bar, such that removal of the handles 33 is by an outward and perhaps downward pull rather than by an upward motion as would be required from the inward disposition shown.

Dessert Precursor Procedure

The Feldpausch technology as recited in U.S. Pat. Nos. 4,948,614 and 5,098,731 and other corresponding foreign patents provides for a frozen dessert based upon masticated banana that is quickly frozen to avoid ice crystals. The freezer apparatus just described meets this criteria of previously quick frozen masticated banana suitable for making the Feldpausch frozen dessert described in U.S. Pat. No. 5,246,175 and other corresponding foreign patents.

While the provision of quick frozen masticated banana for a frozen dessert dispenser was not difficult, the problem that arose was the inability to provide uniform flavored banana based frozen dessert that could be replicated time and time again in a dispenser. A procedure was needed to bring to the preparation dispenser a uniform mix of strawberry banana, or chocolate banana or cashew banana mix among others. Thus the idea for the frozen dessert precursor was born. It is this precursor that forms the process and product aspects of this invention.

The process aspect of this invention pertains to the mode of preparation of what is referred to herein as the precursor of the patented frozen dessert. The term precursor is utilized to designate an intermediate food product that is more than just the raw material for the patented frozen dessert, but is not the dessert itself. The precursor is an intermediate utilized in the patented preparation dispenser, U.S. Pat. No. 5,246,175 or in any other suitable dispenser capable of entraining adequate air into a masticated banana based mix. The term precursor is to be applied to the sandwich discussed below from which individual portions of the actual frozen dessert can be prepared.

The process of this invention utilizes two or more materials some of which include masticated banana and others of which do not. If masticated banana is an ingredient of the mixture, or the sole ingredient, the material shall be designated as fruit 1, fruit 2, fruit 3 et cetera. Different numbers are employed for different banana bases. A banana base is masticated unfrozen banana alone or with another material also unfrozen. All numerical designations herein are totally arbitrary and are used solely for ease of identification.

If the material has no banana in it, then it shall be designated as an additive. Thus a mixture of masticated banana and strawberry puree would be designated as fruit 1, masticated banana alone could be a fruit 2, chocolate syrup mixed with banana could be fruit 3 et cetera. But pure strawberry puree frozen alone would be designated as an additive, as would a mixture of carmel syrup and nuts be designated as an additive.

The process entails freezing as a fruit 1, either pure banana base or banana and another material such as bits of chocolate into long bars that are easily removable from molds. Simultaneously or separately fruit 2 bars can be similarly frozen. Additive bars such as frozen raspberry puree are also formed.

The next step is to form a multipart sandwich from frozen bars, either banana alone or with additive bars, in a predesignated ratio—usually 2 parts fruit bar to one part additive bar. Thus a 3 component sandwich could be fruit 1—additive—fruit 1; fruit 1—additive—fruit 2; or two additives and one fruit, though less preferred results will arise from such last mentioned ratio sandwich.

While sandwiches of 5 bars of frozen material such as 3 parts banana, 1 part strawberry, 1 part frozen chocolate, can be used to form the sandwich, the discussion of the product and process will be limited to a three part sandwich. However 5, 6 and 7 part sandwiches will be recognized as being within the scope of this invention as well as being readily understood without further detailed exploration.

The first step of the process to make a 3 part sandwich is to fill a mold 29-1 with masticated banana, either with or without additional fruits, nuts, et cetera, i.e., a fruit 1 and to fill mold 29-3 with a fruit 1 or fruit 2 as defined above.

In point of fact the additive can be put into any of the three molds of the freezer 18. The middle one is selected solely for operating convenience. See FIG. 3. For the purpose of this discussion we will assume that molds 1 and 3 are filled with the same banana based mix and thus only a reference to fruit 1 need be considered, since there is no fruit 2 that includes masticated banana with another material in this discussion.

The fruit 1 and the additive whatever it may be, but always to be referred to as the additive, are each placed into the respective molds 29, allowed to partially freeze before the handles 33 are inserted and then permitted to totally freeze.

Quick freezing of fruit 1 and the additive can take from 5 to 15 minutes. The actual time depends on the material and the temperature and movement of the brine.

After the contents of the three molds are frozen solid, each filled mold is picked up and dipped into warm water. The metal of the mold expands thereby permitting the frozen bar to be removed by the handles, 33. The frozen fruit 1 bar, designated 36, is either stood on end or laid down upon a polyfilm wrap 42 on a hard work surface such as table 44.

Figure 6:
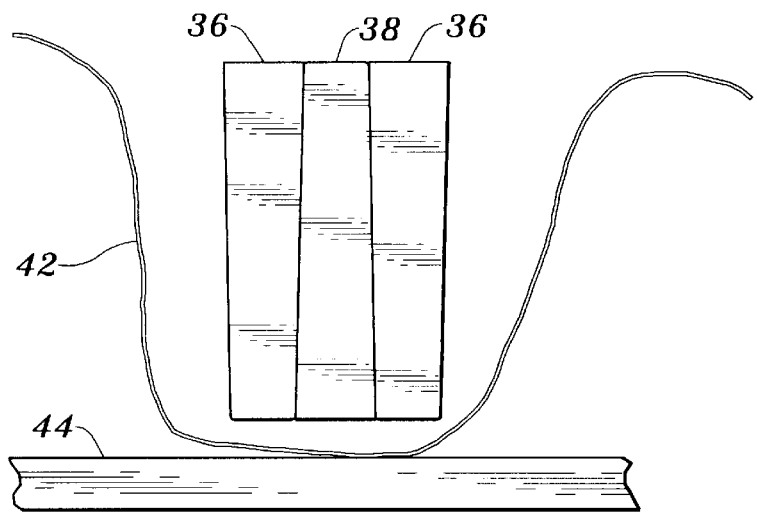
FIG. 6 is an elevational view of a sandwich of three individual frozen blocks of dessert ingredient during the course of a wrapping procedure forming a part of this invention.

Additive bar 38 is inverted such that the top end of 38 designated 39 is placed at the bottom, i.e., at the narrow end 37 of fruit 1 bar 36 to form a laminate. The second fruit 1 bar is then placed upright or if laid down such that its wider end 41 is adjacent the narrower end 40 of the additive bar and laminated in an overlying relationship to the previously formed two bar laminate. See FIGS. 5 & 6. A three bar sandwich consisting of two fruit 1's and an additive in between would be designated as a sandwich.

From a technical point of view, what happens is that after dipping the frozen mold and contents into the warm water, the warmed metal of mold slightly melts the "skin" or surface of the bars, thereby forming a "dew" on the outside of the bar, while the core of the bar stays frozen. When the two bars are lined up and placed in intimate contact together, the surface dew of each is removed from the air and the core cold exudes causing an immediate refreezing, such that the two bars stick together.

One chooses the ratio between the top and the bottom of each bar, by designing a specific cross-section into the respective mold, such that the width of the three element sandwich can be predicated upon the addition of the dimensions of the upper and lower cross sections of the respective bars. The chosen dimension will vary depending upon the number of segments to be used in the ultimate sandwich, here 3. In some sandwiches it may be more desirable to use a bigger and in some sandwiches a smaller size additive bar as the flavor desired and the price of the ingredient may dictate. But in any event the bars are always laminated together face to face.

In the 3-part sandwich as depicted in the figures, the interior diameter preferred is 9/16 inch at the tip and 7/16 inch at the bottom. Thus when the middle segment is pulled from the mold 29-2 and inserted between two other bars, one end of the sandwich will be 9×7×9 sixteenths=25/16 inch while the other end will measure 7×9×7 or 23/16 inch thick. Thus taste of the final product is seen to be determined by the varying of the cross sections of the various frozen bars used to make the dessert precursor. The sandwich just prepared is the precursor.

But for portion control, the minor difference in cross section from end to end of the sandwich is inconsequential since exact portion control is best achieved by the size of the segment cut across the width of the of the full sandwich bar that is utilized. Such constant segment is better than depending upon the cross sectional area of each bar of the sandwich for the size of portion. For the uniform product portion size desired, a certain number of millimeters or 1/8ths of an inch are sheared off the length of the length of the sandwich for delivery into the patented machine. This is similar to the cutting of the length of a bread by an electric slicer, where each bread slice represents a portion.

Thus each slice or segment of the multipart sandwich that enters the dessert maker will produce a single portion of the predetermined volume. A similar sized sandwich slice will also give a second uniform portion size order.

The sandwich is thus designated as the dessert precursor because it itself is not the dessert, but rather it becomes the frozen dessert after treatment and entrainment of air to give it the milky smooth mouth feel of the patented frozen dessert.

It is seen that I have provided an apparatus for the preparation of precursors of my frozen dessert, wherein the actual flavor and taste of the dessert will vary according to the ratio of fruit 1, and fruit 2 if present and if fruit 2 is different from fruit 1 as well as varying due to the nature of the additive middle member of the sandwich. The uniform portion control is achieved by making the same size slice across the entire sandwich, i.e., the fruit 1 (or fruit 1 and fruit 2) with the additive there between.

While the precursor product could be made in a different type of apparatus, such as the freezing compartment of a refrigerator, such a procedure utilizing a slow cooling freezer as found in the home, does not give rise to acceptable results. Long slow freezing of banana has been found to be detrimental to the cells of the banana, such that they break down, a phenomenon that leads to the brown color of old bananas. The quick freezing according to this invention avoids that detrimental effect.

While the main thrust of this invention was to devise a precursor for my banana based frozen dessert, it is readily seen that the quick freezing technology utilized here has applicability to the preparation of precursors for other frozen desserts as well. Thus since it is recognized that one can not quick freeze a mass with a one and a half (1.5) inch thickness, it is also recognzed that one can indeed quick freeze three masses of one half (½) inch thickness and then laminate the three together according to this invention to form the three inch mass.

Thus applicability to the formation of unique flavored frozen yogurts, ice cream and ice milk novelties, and combinations of these three with other concoctions such as frozen pudding, sherbet, gelato and the like, are all within the scope of this invention. One can forsee the freezing of various frozen dessert mixes; such as, vanilla ice cream as a first bar, chocolate pudding as a second bar, and strawberry yogurt as a third bar, all of which are laminated together. The laminate is then mechanically or electrically cut into slices for portion control purposes for use in a soft serve or other type of dispenser.

While the compressor comprising the means for circulating the brine solution and for the removing the heat therefrom is shown in the figures as being at the bottom of the tub, it can similarly be associated with the tub but mounted on the outside thereof.

Since certain changes may be made in the above described apparatus without departing from the scope of the invention herein involved, it is intended that all matter contained in the above description and shown in the accompanying drawings shall be interpreted as illustrative and not in a limiting sense.

I claim:

1. A process of preparing a precursor for a banana based frozen dessert which comprises:

a. masticating at least one portion of a member selected from the group consisting of banana and banana mixed with at least one other edible substance to form a fruit 1;

b. optionally masticating at least one portion of an edible substance which does not include banana to form at least one additive;

c. quick freezing the at least one portion of fruit 1 in a mold having an elongated configuration to form bars;

d. optionally quick freezing the at least one portion of additive in a mold having an elongated configuration to form bars;

e. removing all of the bars from their respective molds;

f. forming a laminate of at least two bars, at least one of which is a fruit 1 bar, by adhering one bar to the other while still frozen, to yield a precursor for a banana based frozen dessert.

2. In the process of claim 1 wherein fruit 1 bars are laminated to additive bars in the ratio of two fruit 1 bars to one additive bar.

3. In the process of claim 1 wherein only fruit bars are quick frozen and laminated together.

4. A process of preparing a precursor for a banana based frozen dessert which comprises:

a. masticating at least one portion of a member selected from the group consisting of banana and banana mixed with at least one other edible substance to form a fruit 1;

b. masticating at least one portion of an edible substance which does not include banana to form at least one additive;

c. quick freeezing the at least one portion of fruit 1 in a mold having an elongated configuration to form bars;

d. quick freezing the at least one portion of additive in a mold having an elongated configuration to form bars;

e. removing all of the bars from their respective molds;

f. forming a laminate of at least three bars, wherein the number of fruit 1 bars is at least the same as the number of additive bars, by adhering one bar to the other while still frozen, to yield a precursor for a banana based frozen dessert.

5. A process of preparing a precursor for a frozen dessert which comprises:

a. quick freezing a plurality of portions of frozen dessert mix of at least one member selected from the group comprising ice cream mix, ice milk mix, yogurt, pudding, and sherbet in a mold having an elongated configuration to form individual bars;

b. removing all of the bars from their respective molds;

c. forming a laminate of at least two bars, by adhering one bar to the other while still frozen, to yield a precursor for a frozen dessert.

6. A precursor for a frozen dessert which precursor is prepared by the process which comprises the steps of:

(A) preparing a plurality of individual quick frozen bars selected from the group consisting of bars of masticated banana alone, bars of masticated banana in combination with other edible substances; and bars of an additive which is a quick frozen edible substance that contains no banana;

by quick freezing a series of molds, each of which molds contains one of, masticated banana alone, masticated banana in combination with other edible substances; and an additive;

(B) removing the frozen bars from their respective molds while maintaining a frozen core within the individual bars;

(C) aligning each pair of bars to be laminated;

(D) laminating at least one masticated banana bar to another bar previously formed by quick freezing, to yield the precursor of the frozen dessert which can be manually handled, and wherein each member of the laminate is about one half inch in thickness.

7. The precursor of claim 6 wherein the laminate contains 3 bars laminated together.

8. The precursor of claim 7 wherein the laminate includes at least one and not more than 2 bars of an additive.

9. The precursor of claim 6 wherein the individual previously released from a mold bars are selected from the group consisting of ice cream mix, ice milk mix, pudding, yogurt, sherbet, fruit and mixtures thereof.

10. The precursor of claim 6 wherein the ratio of frozen bars comprising masticated banana to frozen additive bars is at least 1:1.

11. The precursor of claim 6 wherein the laminate contains one bar comprising only masticated banana, one bar of masticated banana and another edible substance.

12. The precursor of claim 6 wherein the laminate contains one bar comprising only masticated banana, and one bar of masticated banana and another edible substance.

13. The precursor of claim 12 wherein the laminate further includes a bar of a frozen additive.

14. A precursor for a frozen banana based frozen dessert, which precursor is prepared by the process which comprises the steps of:

(A) quick freezing at least one portion of masticated banana in a mold having an elongated configuration to form bars therefrom;

(B) quick freezing at least one portion of an edible substance that contains no banana in like manner to form bars thereof;

(C) quick freezing at least one portion of a mixture of an edible substance that contains no banana, with masticated banana to form frozen bars of the mixture, (D) demolding the bars while maintaining a frozen core therein;

(E) laminating the previously prepared quick frozen bars, in any combination of at least one bar from step (A) with at least one other previously prepared quick frozen bar to yield the precursor and wherein each member of the laminate is about one half inch in thickness.

* * * * *